(12) United States Patent
Cho et al.

(10) Patent No.: US 9,019,879 B2
(45) Date of Patent: Apr. 28, 2015

(54) METHOD AND APPARATUS FOR TRANSMITTING AND RECEIVING SYSTEM INFORMATION UPDATE CONTROL INFORMATION IN WIRELESS COMMUNICATION SYSTEM

(75) Inventors: Hee Jeong Cho, Anyang-si (KR); Ki-Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 13/520,321

(22) PCT Filed: Jan. 3, 2011

(86) PCT No.: PCT/KR2011/000003
§ 371 (c)(1),
(2), (4) Date: Oct. 25, 2012

(87) PCT Pub. No.: WO2011/081504
PCT Pub. Date: Jul. 7, 2011

(65) Prior Publication Data
US 2013/0039242 A1 Feb. 14, 2013

Related U.S. Application Data

(60) Provisional application No. 61/291,914, filed on Jan. 3, 2010, provisional application No. 61/314,590, filed on Mar. 17, 2010.

(30) Foreign Application Priority Data

Dec. 30, 2010 (KR) ........................ 10-2010-0138732

(51) Int. Cl.
*H04W 52/02* (2009.01)
(52) U.S. Cl.
CPC ................................ *H04W 52/0216* (2013.01)

(58) Field of Classification Search
CPC . H04W 52/02; H04W 52/0203; H04W 84/12; H04W 84/18
USPC .................................................. 370/310, 311
See application file for complete search history.

(56) References Cited

U.S. PATENT DOCUMENTS

| 2010/0002631 A1* | 1/2010 | Cho et al. ...................... 370/328 |
| 2011/0090884 A1* | 4/2011 | Won et al. ..................... 370/338 |

OTHER PUBLICATIONS

Yi Hsuan et al., "Proposal to use a single CRC for both P-SFH and S-SFH in the 802.16m AWD (16.3.6)", IEEE 802.16 Broadband Wireless Access Working Group, Dec. 31, 2000.
Xin Xia et al. "Proposal for Technology Description Template (TDT)—Characteristics", IEEE 802.16 Broadband Wireless Access Working Group, Mar. 5, 2009.

* cited by examiner

*Primary Examiner* — Andrew Lai
*Assistant Examiner* — Zhiren Qin
(74) *Attorney, Agent, or Firm* — McKenna Long & Aldridge LLP

(57) ABSTRACT

The present invention relates to a method and apparatus for transmitting and receiving system information update control information in a sleep mode in a wireless communication system. According to one aspect of the present invention, a method in which a terminal in a sleep mode receives system information update control information in a wireless communication system comprises: receiving, by the terminal from a base station, system information update control information including information on whether or not each of a plurality of secondary super frame header subpacket information elements (hereinafter, referred to as "S-SFH SP IEs") is changed during a listening window; and receiving a changed S-SFH SP IE using the system information update control information.

18 Claims, 5 Drawing Sheets

METHOD AND APPARATUS FOR TRANSMITTING AND RECEIVING SYSTEM INFORMATION UPDATE CONTROL INFORMATION IN WIRELESS COMMUNICATION SYSTEM

This application is a 35 U.S.C. §371 National Stage Entry International Application No. PCT/KR2011/000003, filed Jan. 3, 2011 and claims the benefit of U.S. Provisional Application Nos. 61/219,914, filed Jan. 3,2010, 61/314,590, filed Mar. 17,2010, and Korean application No: 10-2010-0138732, filed Dec. 30,2010, all of which are incorporated by reference in their entirety herein.

FIELD OF THE INVENTION

The present invention relates to a wireless communication system and, more particularly, to a method and apparatus for transmitting and receiving system information update control information in a sleep mode in a wireless communication system.

BACKGROUND ART

First of all, a related art sleep mode operation will be described in detail with reference to FIG. 1. A mobile station (or mobile terminal or user equipment) may perform communication with a base station in a normal mode or an active mode, and, when there is no traffic to be transmitted or received to or from the base station, the mobile terminal may transmit a sleep request (hereinafter referred to as "AAI_SLP-REQ") message to the base station, so as to request a shift in the operation mode to a sleep mode. As a response to the received sleep request message, the base station may transmit a sleep response (hereinafter referred to as "AAI_SLP-RSP") message to the mobile station. Then, after receiving the transmitted sleep response message, the mobile station may shift its operation mode to the sleep mode by applying sleep parameters, such as a Sleep Cycle, listening window, and so on, which are included in the AAI_SLP-RSP message. Furthermore, by transmitting an unsolicited AAI_SLP-RSP message to the mobile station, the base station may shift the operation mode of the mobile station to the sleep mode.

FIG. 1 illustrates a related art sleep mode operation of a mobile station. As shown in FIG. 1, after shifting its operation mode from a normal mode to a sleep mode, the mobile station may operate in the sleep mode by applying an initial sleep cycle. After shifting to the sleep mode, the first sleep cycle include only a sleep window.

After the first sleep cycle, the mobile station activates the sleep mode by applying a sleep cycle, which includes a listening window and a sleep window, starting from the second sleep cycle. When the mobile station receives a traffic indication (hereinafter referred to as "TRF-IND") message, which includes a negative indication, during the listening window, the mobile station determines that there is no traffic being transmitted via uplink. And, accordingly, the mobile station doubles the current sleep cycle. Once the doubled sleep cycle is completed, when the mobile station receives a TRF-IND message, which includes a positive indication, during the listening window of the next sleep cycle, the mobile station may reset the current sleep cycle to the initial sleep cycle.

Hereinafter, a method performed by the mobile station for updating information of an S-SFH SP IE (secondary super frame header subpacket information element) will be described in detail.

The mobile station receives a P-SFH IE (primary super frame header information element) and verifies an S-SFH change count field. Then, each time the S-SFH IE information is updated, the base station increments the value of the S-SFH change count field by 1.

When the mobile station verifies that the S-SFH change count value is different from the value assigned to the corresponding mobile station, the mobile station determines that the S-SFH SP IE has been changed. And, then, the mobile station verifies an S-SFH SP change bitmap of the P-SFH IE so as to determine which S-SFH SP has been updated.

Subsequently, the mobile station verifies S-SFH Scheduling information from the P-SFH IE, so as to determine which S-SFH SP IE is being transmitted from the current super frame. When an S-SFH SP IE, which is to be updated in the current SFH, is transmitted, the mobile station verifies and updates the corresponding S-SFH SP IE. Alternatively, when an S-SFH SP IE, which is to be updated in the current SFH, is not transmitted, the mobile station receives and updates an S-SFH SP IE in a next cycle during which the S-SFH SP IE that is to be updated in the current SFH is transmitted.

Thereafter, the S-SFH application hold indicator indicates the system parameter included in which S-SFH is being applied to the current super frame. More specifically, when the S-SFH application hold indicator is 0, the mobile station applies a system parameter related to an S-SFH change count field value of the current super frame. And, when the S-SFH application hold indicator is 1, the mobile station applies a system parameter related to ((S-SFH change count field value of the current super frame-1)modulo 16.

Table 1 indicates a format of the P-SFH IE.

TABLE 1

| Syntax | Size (bit) | Notes |
|---|---|---|
| P-SFH IE format ( ) { | | |
|     LSB of superframe number | 4 | Part of superframe number |
|     S-SFH change count | 4 | Indicates the value of S-SFH change count associated with the S-SFH SPx IE(s) transmitted in this S-SFH change cycle |
|     S-SFH size extension | 2 | 0b00: $Size_{SPx,extension} = 0$<br>0b01: $Size_{SPx,extension} = 8$<br>0b10: $Size_{SPx,extension} = 16$<br>0b11: $Size_{SPx,extension} = 24$ |
|     Number of repetitions for S-SFH ($N_{Rep,S-SFH}$) | 2 | Indicate the number of repetitions used for S-SFH transmission.<br>0b00: reserved<br>0b01: 6<br>0b10: 3<br>0b11: 1 |

TABLE 1-continued

| Syntax | Size (bit) | Notes |
|---|---|---|
| S-SFH scheduling information | 2 | Indicates which S-SFH SP IE is included in S-SFH at this superframe<br>0b00: S-SFH SP1 IE<br>0b01: S-SFH SP2 IE<br>0b10: S-SFH SP3 IE<br>0b11: no S-SFH |
| S-SFH SP change bitmap | 3 | Indicates the change in the content of S-SFH SPx IE(s) between current SFH and previous SFH associated with the S-SFH change count.<br>If bit#0 (LSB) = 1, change in 3-SFH SP1 IE. Otherwise no change in SP1 IE.<br>If bit#1 = 1, change in S-SFH SP2 IE. Otherwise no change in SP2 IE.<br>If bit#2 (MSB) = 1, change in S-SFH SP3 IE. Otherwise no change in SP3 IE. |
| S-SFH application hold indicator | 1 | Indicate the S-SFH change count value used to determine the S-SFH SPx IE content to apply in this superframe:<br>0b0: Use S-SFH SPx IE content associated with the current S-SFH change count<br>0b1: Use S-SFH SPx IE content associated with (the current S-SFH change count − 1) modulo 16 |
| Reserved | 3 | The reserved bits are for future extension. |

Table 2 indicates a format of the S-SFH IE. The system parameter and system configuration information, which are included in the S-SFH, may be categorized as S-SFH sub-packet IE1 (S-SFH SP IE1), S-SFH SP IE2, S-SFH SP IE3. Herein, each of the S-SFH SP IE1, S-SFH SP IE2, and S-SFH SP IE3 is transmitted at different times at different cycles. S-SFH SP IE1 includes information for network reentry. S-SFH SP IE2 includes information for initial network entry and network discovery. And, S-SFH SP IE3 includes the remaining essential information for network (re)entry.

TABLE 2

| Syntax | Size (bit) | Notes |
|---|---|---|
| S-SFH IE format ( ) {<br>  if (S-SFH Scheduling information == 0b00)<br>  {<br>    S-SFH SP1 IE ( ) | $Size_{SP1}$ | Includes S-SFH SP1 IE in Table 832.<br>The size of S-SFH SP1 IE depends on FFT size.<br>For 2048 FFT,<br>$Size_{SP1, default} = 96$<br>For 1024 FFT,<br>$Size_{SP1, default} = 90$<br>For 512 FFT,<br>$Size_{SP1, default} = 84$ |
| }<br>else if (S-SFH Scheduling information == 0b01) {<br>  S-SFH SP2 IE ( ) | $Size_{SP2}$ | Includes S-SFH SP2 IE in Table 833.<br>The size of S-SFH SP2 IE depends on FFT size.<br>For 2048 FFT,<br>$Size_{SP2, default} = 96$<br>For 1024 FFT,<br>$Size_{SP2, default} = 90$<br>For 512 FFT,<br>$Size_{SP2, default} = 86$ |
| }<br>else if (S-SFH Scheduling information == 0b10) { | | |

TABLE 2-continued

| Syntax | Size (bit) | Notes |
|---|---|---|
| S-SFH SP3 IE ( )<br>}<br>} | $Size_{SP3}$ | Includes S-SFH SP3 IE in Table 834.<br>$Size_{SP3, default} = 77$ |

Accordingly, in order to perform smooth communication with the base station, the mobile station operating in the sleep mode should be provided with the most recent (or recently updated) system information, that is being transmitted through the SFH. However, the related art method is disadvantageous in that, when a frame through which the P-SCH is being transmitted exists in the sleep window of the mobile station, the mobile station cannot receive the P-SCH, which enables the mobile station to determine whether or not a change in the system information occurs.

DETAILED DESCRIPTION OF THE INVENTION

Technical Objects

As described above, the related art method is disadvantageous in that, when a frame through which the P-SCH is being transmitted exists in the sleep window of the mobile station, the mobile station cannot receive the P-SCH.

An object of the present invention is to provide a method for receiving system information update control information without any additional (or separate) power consumption, when the mobile station is being operated in the sleep mode.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the above-described technical objects of the present invention, according to an aspect of the present invention, in a method for receiving system information update control information by a mobile station operating in a sleep mode in a wireless communication system, the mobile station receives system information update control information from a base station during a listening window, the system information update control information including information on whether or not a change has occurred in each of a plurality of secondary super frame header subpacket information elements (hereinafter referred to as "S-SFH SP IEs"), and receives a changed S-SFH SP IE by using the received system information update control information.

At this point, the system information update control information may include a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

Additionally, the system information update control information may further include a third field indicating an application time point of the S-SFH SP IE corresponding to a value of the first field.

Also, the third field may correspond to a super frame number of a super frame to which the S-SFH SP IE corresponding to the value of the first field is being applied.

And, the third field may correspond to a super frame offset starting from the time point, at which the system information update control information is being transmitted, to a time point, at which the S-SFH SP IE corresponding to the value of the first field is being applied.

Additionally, the system information update control information may further include a fourth field indicating a transmission time point, at which a changed S-SFH SP IE is being transmitted.

Furthermore, the system information update control information may be transmitted through any one of an A-MAP IE(Advanced-MAP Information Element), a MAC management message, a signaling header, and an extended header.

In order to achieve the above-described technical objects of the present invention, according to another aspect of the present invention, in a method for transmitting system information update control information from a base station in a wireless communication system, the base station transmits system information update control information to a mobile station operating in a sleep mode during a listening window, the system information update control information including information on whether or not a change has occurred in each of a plurality of secondary super frame header subpacket information elements (hereinafter referred to as "S-SFH SP IEs"), and transmits a changed S-SFH SP IE by using the received system information update control information.

In order to achieve the above-described technical objects of the present invention, according to yet another aspect of the present invention, when a mobile station is operating in a sleep mode, the mobile station includes a reception module configured to receive system information update control information from a base station during a listening window, while the mobile station is being operated in a sleep mode, the system information update control information including information on whether or not a change has occurred in each of a plurality of secondary super frame header subpacket information elements (hereinafter referred to as "S-SFH SP IEs"), and to receive a changed S-SFH SP IE by using the received system information update control information, and a central processing unit (CPU) configured to apply system information of the changed S-SFH SP IE.

In order to achieve the above-described technical objects of the present invention, according to yet another aspect of the present invention, a base station includes a central processing unit (CPU) configured to generate system information update control information, the system information update control information including information on whether or not a change has occurred in each of a plurality of secondary super frame header subpacket information elements (hereinafter referred to. as "S-SFH SP IEs"), and a transmission module configured to transmit the system information update control information to a mobile station operating in a sleep mode, during a listening window of the mobile station.

In order to achieve the above-described technical objects of the present invention, according to yet another aspect of the present invention, a mobile station includes a central processing unit (CPU) configured to control operations of the mobile station, memory configured to store information related to communication with a base station, and a communication module configured to control the communication with the base station, wherein the communication module includes a reception module configured to receive system information update control information from a base station during a listening window, while the mobile station is being operated in a sleep mode, the system information update control information including information on whether or not a change has occurred in each of a plurality of secondary super frame header subpacket information elements (hereinafter referred to as "S-SFH SP IEs"), and to receive a changed S-SFH SP IE by using the received system information update control information.

In order to achieve the above-described technical objects of the present invention, according to a further aspect of the present invention, a base station includes a central processing unit (CPU) configured to control operations of the base station, a memory configured to store information related to communication, and a communication module configured to control the communication, wherein the communication module includes a transmission module configured to transmit system information update control information to a mobile station operating in a sleep mode during a listening window, the system information update control information including information on whether or not a change has occurred in each of a plurality of secondary super frame header subpacket information elements (hereinafter referred to as "S-SFH SP IEs").

Effects of the Invention

According to the embodiments of the present invention, while the mobile station is being operated in the sleep mode, the mobile station may use the system information update control information so as to efficiently receive and update the changed system information.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
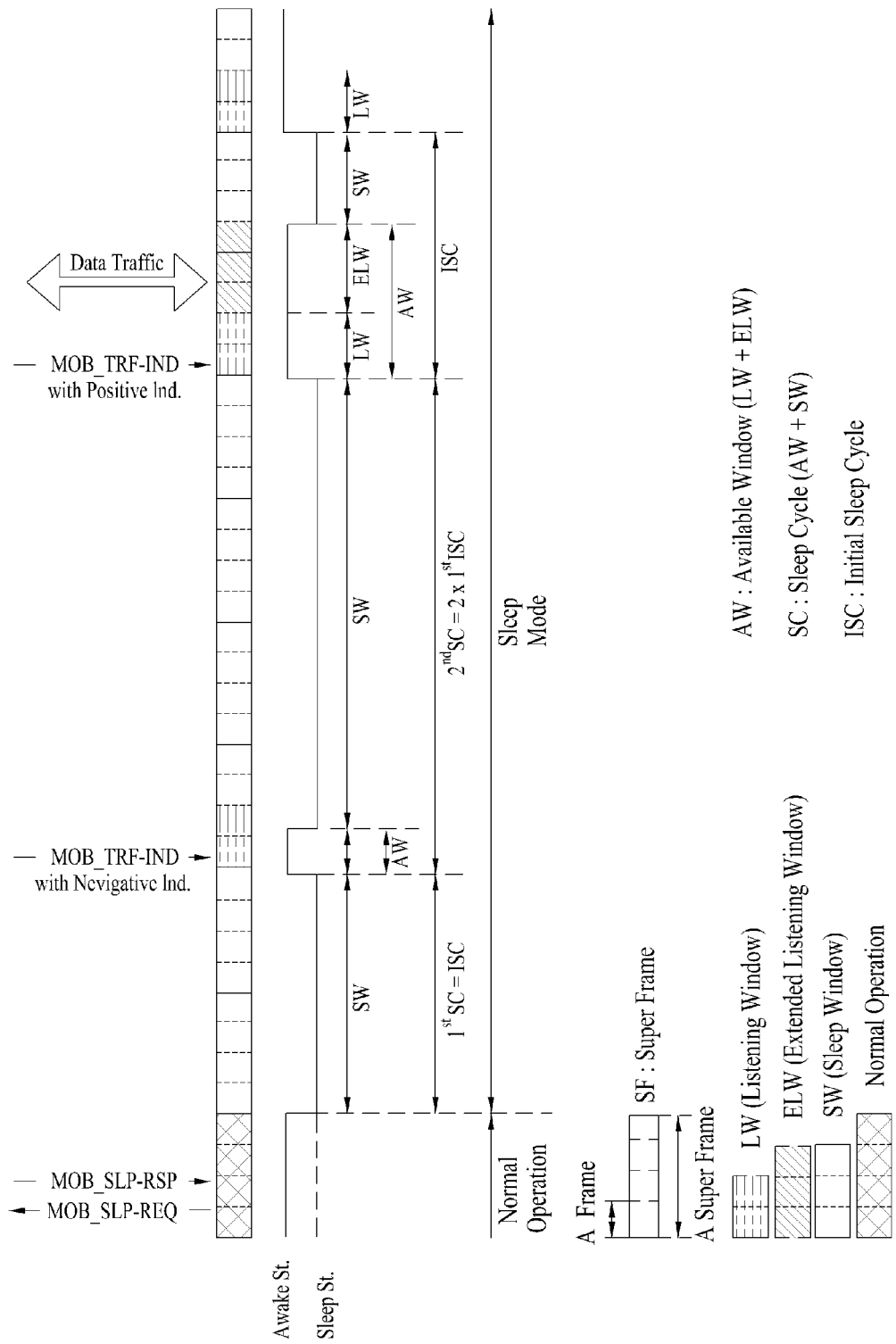
FIG. 1 illustrates a related art sleep mode operation of a mobile station.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP2 802.16 system. However, with the exception for the unique features of the 3GPP2 802.16 system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it will be assumed that the term mobile station is used to collectively refer to a mobile or fixed user-end device, such as a UE (User Equipment), an MS (Mobile Station), and so on. Additionally, it will also be assumed that the term base station is used to collectively refer to a random node of a network end communicating with the mobile station, such as Node B, eNode B, Base Station, and so on.

Hereinafter, the method for receiving system information update control information of a mobile station, which is being operated in the sleep mode according to the embodiment of the present invention will be described in detail with reference to the accompanying drawings.

According to the exemplary embodiment of the present invention, the base station transmits system information update control information to the mobile station during a listening window of the corresponding mobile station.

Figure 2:
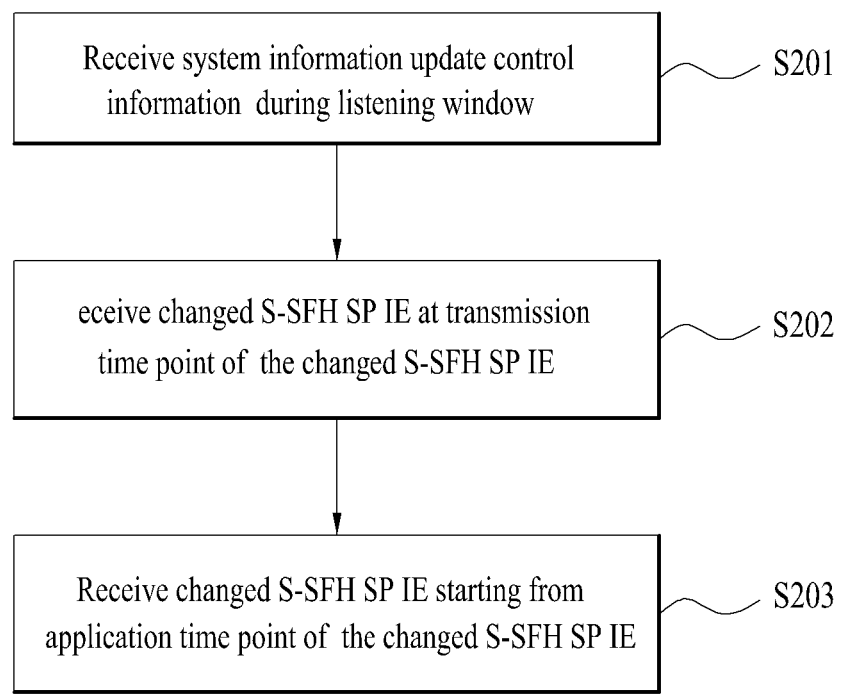
FIG. 2 illustrates a method of the mobile station for receiving system information update control information according to an exemplary embodiment of the present invention.

FIG. 2 illustrates a method of the mobile station for receiving system information update control information according to an exemplary embodiment of the present invention.

As shown in FIG. 2, the mobile station receives the system information update control information from the base station during the listening window (S201). The system information update control information includes information related to whether or not a change has occurred in the secondary super frame header subpacket information element (hereinafter referred to as "S-SFH SP IE").

When a change has occurred in the S-SFH SP IE, the base, station may transmit the system information update control information only at a specific (or pre-determined) time point, or the base station may repeatedly transmit the system information update control information during a specific (or pre-determined) time period.

Additionally, the base station may gather multiple mobile stations being operated in the sleep mode into a single mobile station group, so as to transmit the system information update control information to the mobile station group, or the base station may transmit the system information update control information to each of the mobile stations being operated in the sleep mode. In case the base station transmit the system information update control information to the group of mobile stations being operated in the sleep mode, the base station may define and use an STID (station identifier) for transmitting the transmit the system information update control information.

In case the system information update control information is not received within the listening window, the mobile station recognizes (or determines) that a change has not occurred in the S-SFH SP IE.

More specifically, the system information update control information includes an S-SFH change count field, an S-SFH SP change bitmap field, an application time point field, and a scheduling information field.

The S-SFH change count field indicates version information of an S-SFH that is being at the point when the system information update control information is transmitted, or version information of an S-SFH that is to be transmitted starting from the point when the system information update control information is transmitted.

The S-SFH SP change bitmap indicates which S-SFH SP has been changed. More specifically, when it is assumed that the S-SFH SP change bitmap field is assigned with a value of 'XYZ', Z may indicate whether or not a change has occurred in S-SFH SP1, Y may indicate whether or not a change has occurred in S-SFH SP2, and X may indicate whether or not a change has occurred in S-SFH SP3. For example, when Z is equal to 1, this indicates that a change has occurred in S-SFH SP1, and when Z is equal to 0, this indicates that a change has not occurred in S-SFH SP1. Similarly, when Y is equal to 1, this indicates that a change has occurred in S-SFH SP2, and when Y is equal to 0, this indicates that a change has not occurred in S-SFH SP2. And, when X is equal to 1, this indicates that a change has occurred in S-SFH SP3, and when X is equal to 0, this indicates that a change has not occurred in S-SFH SP3.

The application time point field indicates a time point at which the S-SFH SP IE of the corresponding version is being applied. The application time point field may be expressed in the form of a super frame number of a super frame to which the S-SFH SP IE of the corresponding version is being applied, or expressed in the form of partial LSB bits of the super frame number, or expressed in the form of a super frame offset starting from a time point, at which the system information update control information is being transmitted, to a time point, at which the S-SFH SP IE of the corresponding version is being applied. In case the S-SFH SP IE of the corresponding version is being applied at the point when the system information update control information is being transmitted, the value of the application time point field may be set to a value indicating that the S-SFH SP IE of the corresponding version is currently being applied. For example, the value of the application time point field may be set to 0, which indicates that the S-SFH SP Ie is being applied.

The scheduling information field indicates a transmission time point of a changed S-SFH SP IE. The scheduling information field may be expressed in the form of a super frame number of a super frame to which the changed S-SFH SP IE is being applied, or expressed in the form of partial LSB bits of the super frame number, or expressed in the form of a super frame offset starting from a time point, at which the system information update control information is being transmitted, to a time point, at which the changed S-SFH SP IE is being applied.

The system information update control information may be transmitted through an A-MAP IE (Advanced-MAP Information Element), MAC management message, signaling header, or extended header.

Table 3 indicates a format of an A-MAP IE that is being used for the transmission of the system information update control information. In order to transmit the system information update control information, the base station may design a new A-MAP IE, or may use a conventional (or already existing) A-MAP IE, such as a Broadcast Assignment A-MAP IE, so as to transmit the system information update control information.

TABLE 3

| Syntax | Size in bits | Description/Notes |
|---|---|---|
| A-MAP IE { | | |
| A-MAP IE Type | 4 | |
| S-SFH change count | 4 | |
| S-SFH SP change bitmap | 3 | may be expressed in a toggle format, or a bit corresponding to the changed SP may be set to 1. |
| Super frame number / offset | 7 | Application time point |
| SP 1 transmission super frame number / offset | 7 | may be transmitted only when the bit position value of the S-SFH SP change bitmap corresponding to SP1 is either toggled or set to 1. |
| SP 2 transmission super frame number / offset | 7 | may be transmitted only when the bit position value of the S-SFH SP change bitmap corresponding to SP2 is either toggled or set to 1. |
| SP 3 transmission super frame number / offset | 7 | may be transmitted only when the bit position value of the S-SFH SP change bitmap corresponding to SP3 is either toggled or set to 1. |
| reserved } | | |

Table 4 indicates a format of a MAC management message that is being used for the transmission of the system information update control information. In order to transmit the system information update control information, the base station may design a new MAC management message, or may use a sleep mode related message, such as a sleep request (SLP-REQ) message, a sleep response (SLP-RSP) message, or a traffic indication (TRF-IND) message, so as to transmit the system information update control information.

TABLE 4

| Syntax | Size in bits | Description/Notes |
|---|---|---|
| Message Type | 8 | e.g., TRF-IND |
| SFH update information included | 1 | |
| If SFH update information included == 1 { | | |
| S-SFH change count | 4 | |
| S-SFH SP change bitmap | 3 | may be expressed in a toggle format, or a bit corresponding to the changed SP may be set to 1. |
| Super frame number / offset | 7 | Application time point |
| SP 1 transmission super frame number / offset | 7 | may be transmitted only when the bit position value of the S-SFH SP change bitmap corresponding to SP1 is either toggled or set to 1. |
| SP 2 transmission super frame number / offset | 7 | may be transmitted only when the bit position value of the S-SFH SP change bitmap corresponding to SP2 is either toggled or set to 1. |
| SP 3 transmission super frame number / offset | 7 | may be transmitted only when the bit position value of the S-SFH SP change bitmap corresponding to SP3 is either toggled or set to 1. |
| Reserved } } | | |

Table 5 indicates a signaling header being used for the transmission of the system information update control information.

TABLE 5

| Syntax | Size (bit) | Notes |
|---|---|---|
| Signaling header( ) { | | |
| FID | 4 | Flow Identifier. This field indicates MAC signaling header |
| Type | 4 | MAC signaling header type |
| S-SFH change count | 4 | |
| S-SFH SP change bitmap | 3 | may be expressed in a toggle format, or a bit corresponding to the changed SP may be set to 1. |
| Super frame number / offset | 7 | Application time point |
| SP 1 transmission super frame number / offset | 7 | may be transmitted only when the bit position value of the S-SFH SP change bitmap corresponding to SP1 is either toggled or set to 1. |
| SP 2 transmission super frame number / offset | 7 | may be transmitted only when the bit position value of the S-SFH SP change bitmap corresponding to SP2 is either toggled or set to 1. |
| SP 3 transmission super frame number / offset | 7 | may be transmitted only when the bit position value of the S-SFH SP change bitmap corresponding to SP3 is either toggled or set to 1. |
| Padding | variable | |
| } | | |

Table 6 indicates an extended header being used for the transmission of the system information update control information.

TABLE 6

| Syntax | Size (bit) | Notes |
| --- | --- | --- |
| EH ( ) { | | |
| Type | 4 | MAC signaling header type |
| S-SFH change count | 4 | |
| S-SFH SP change bitmap | 3 | may be expressed in a toggle format, or a bit corresponding to the changed SP may be set to 1. |
| Super frame number / offset | 7 | Application time point |
| SP 1 transmission super frame number / offset | 7 | may be transmitted only when the bit position value of the S-SFH SP change bitmap corresponding to SP1 is either toggled or set to 1. |
| SP 2 transmission super frame number / offset | 7 | may be transmitted only when the bit position value of the S-SFH SP change bitmap corresponding to SP2 is either toggled or set to 1. |
| SP 3 transmission super frame number / offset | 7 | may be transmitted only when the bit position value of the S-SFH SP change bitmap corresponding to SP3 is either toggled or set to 1. |
| Padding | variable | |
| } | | |

Referring back to FIG. 2, the mobile station receives the changed S-SFH SP IE at the transmission time point of the changed S-SFH SP IE (S202).

In case the value of the S-SFH change count field, which is included in the system information update control information, is different from the S-SFH change count value stored in the mobile station, the mobile station may determine that the S-SFH SP IE has changed after the update of the S-SFH SP IE performed by the mobile station. And, by referring to the S-SFH SP change bitmap, the mobile station may identify which S-SFH SP IE has been changed, Additionally, the mobile station may use a pre-known transmission cycle period information of the S-SFHs or may use the value of a scheduling information field, which is included in the system information update control information, so as to determine the transmission time point of the changed S-SFH SP IE. S-SFH SP IE3 may include the transmission cycle period information of each S-SFH SP IE, and, by receiving the S-SFH SP IE3, the mobile station may be informed in advance of the transmission cycle period information of each of the S-SFH SP IEs. The mobile station receives the changed S-SFH SP IE at the transmission time point of the changed S-SFH SP IE.

The mobile station applies the system information included in the changed S-SFH SP IE starting from the application time point of the changed S-SFH SP IE (S203).

Figure 3:
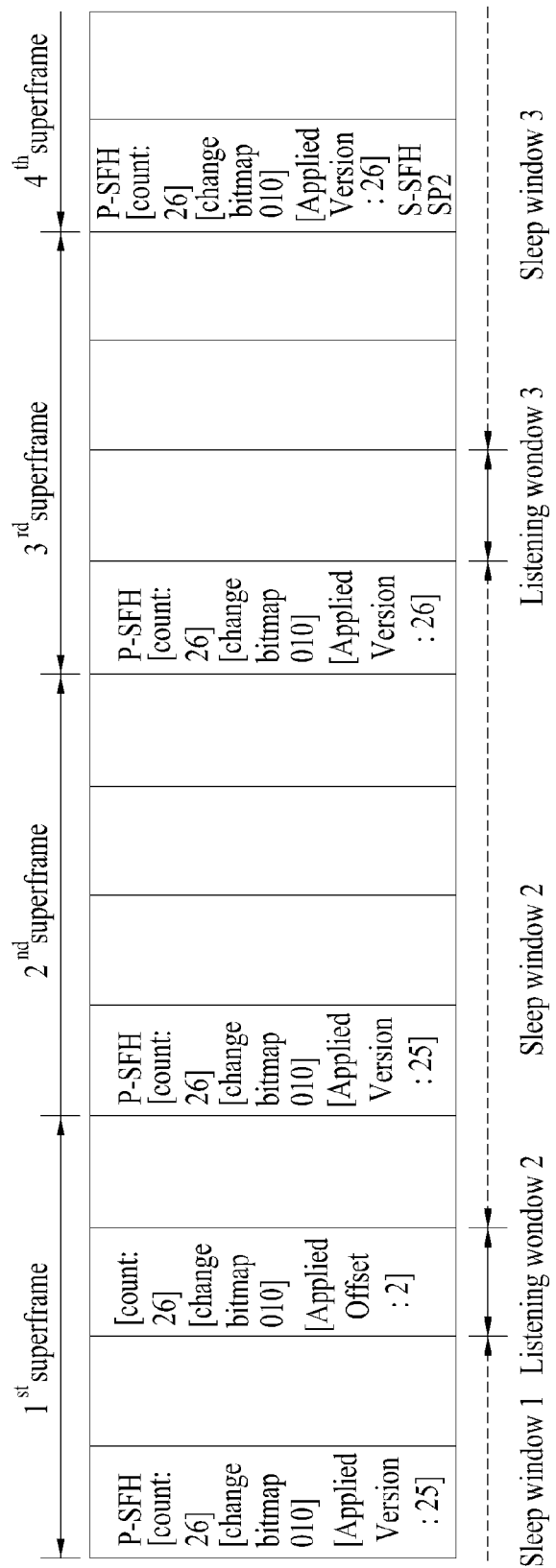
FIG. 3 illustrates an exemplary method of the mobile station for receiving system information update control information according to an exemplary embodiment of the present invention.

FIG. 3 illustrates an exemplary method of the mobile station for receiving system information update control information according to an exemplary embodiment of the present invention.

Referring to FIG. 3, it is assumed that the mobile station is in a state of storing system information of S-SFH SP IEs each having an S-SFH change count value of 25. During a first frame of a first super frame, the base station transmits a P-SFH. However, being operated in the sleep mode, the mobile station is incapable of receiving the P-SFH. Accordingly the base station transmits system information update control information to the mobile station, which is being operated in the sleep mode, during the listening window of the corresponding mobile station. At this point, in the system information update control information, the value of the S-SFH change count field is equal to 26, the value of the S-SFH SP change bitmap field value is equal to 010, and the value of the application time point field is equal to 2.

Accordingly, since the value of the S-SFH change count field, which is included in the system information update control information, is different from the S-SFH change count value stored in the corresponding mobile station, the mobile station may determine that the S-SFH SP IE has been changed. Additionally, by referring to the change bitmap field, the mobile station may determine that S-SFH SP IE2 has been changed. And, by referring to the application time field, the mobile station may also determine that the changed S-SFH SP IE2 is being applied starting from a third super frame.

Furthermore, the mobile station may use the pre-known transmission cycle period information of the S-SFH SP IEs, or may use the value of the scheduling information field, which is included in the system information update control information, so as to receive the changed S-SFH SP IE at the time point when the changed S-SFH SP IE is being transmitted.

However, as shown in FIG. 3, when the changed S-SFH SP IE2 is transmitted from the fourth super frame, the mobile station fails to receive the changed S-SFH SP IE2 in the second frame of the third super frame, which corresponds to the next listening window. Accordingly, since the mobile station is not provided with the system information applied to the base station, even if the mobile station possesses data that are to be transmitted to the base station, the mobile station does not transmit any uplink data to the base station before receiving the changed S-SFH SP IE2. At this point, in order to prevent any uplink data transmission delay of the mobile station from occurring, the base station may separately transmit additional system information in addition to the regular system information transmission. The transmission point of the additional system information may correspond to a listening window of the corresponding mobile station(s).

Figure 4:
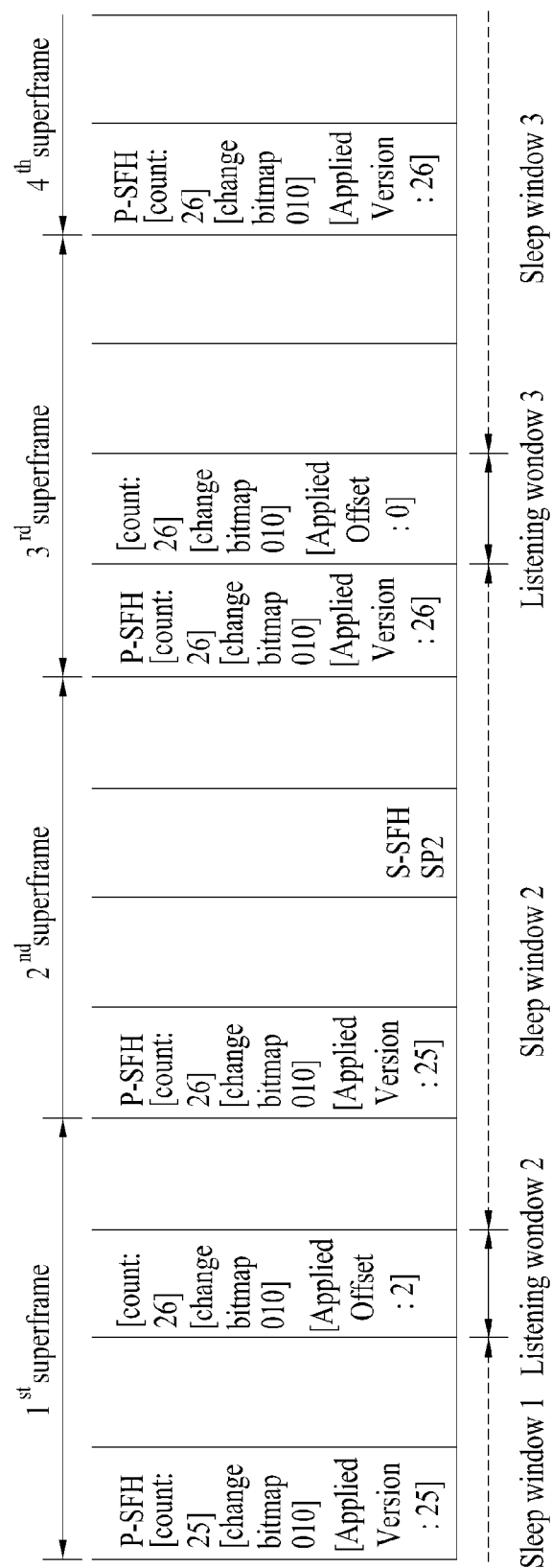
FIG. 4 illustrates another exemplary method of the mobile station for receiving system information update control information according to an exemplary embodiment of the present invention.

FIG. 4 illustrates another exemplary method of the mobile station for receiving system information update control information according to an exemplary embodiment of the present invention.

Referring to FIG. 4, it is assumed that the mobile station is in a state of storing system information of S-SFH SP IEs each having an S-SFH change count value of 25. During a first frame of a first super frame, the base station transmits a P-SFH. However, being operated in the sleep mode, the mobile station is incapable of receiving the P-SFH. Accordingly the base station transmits system information update control information to the mobile station, which is being operated in the sleep mode, during the listening window of the corresponding mobile station. At this point, in the system information update control information, the value of the S-SFH change count field is equal to 26, the value of the S-SFH SP change bitmap field value is equal to 010, and the value of the application time point field is equal to 2.

Accordingly, since the value of the S-SFH change count field, which is included in the system information update control information, is different from the S-SFH change count value stored in the corresponding mobile station, the mobile station may determine that the S-SFH SP IE has been changed, even if the mobile station does not receive the P-SFH. Additionally, by referring to the change bitmap field, the mobile station may determine that S-SFH SP IE2 has been changed. And, by referring to the application time field, the mobile station may also determine that the changed S-SFH SP IE2 is being applied starting from a third super frame.

Furthermore, the mobile station may use the pre-known transmission cycle period information of the S-SFH SP IEs, or may use the value of the scheduling information field, which is included in the system information update control information, so as to receive the changed S-SFH SP IE at the time point when the changed S-SFH SP IE is being transmitted. Referring to FIG. 4, the mobile station may receive the changed S-SFH SP IE2 in the $3^{rd}$ frame of the $2^{nd}$ super frame, and may apply the changed S-SFH SP IE2 starting from the third super frame. Also, during the listening window, which corresponds to the $2^{nd}$ frame of the third super frame, the mobile station may transmit and receive data to and from the base station.

Figure 5:
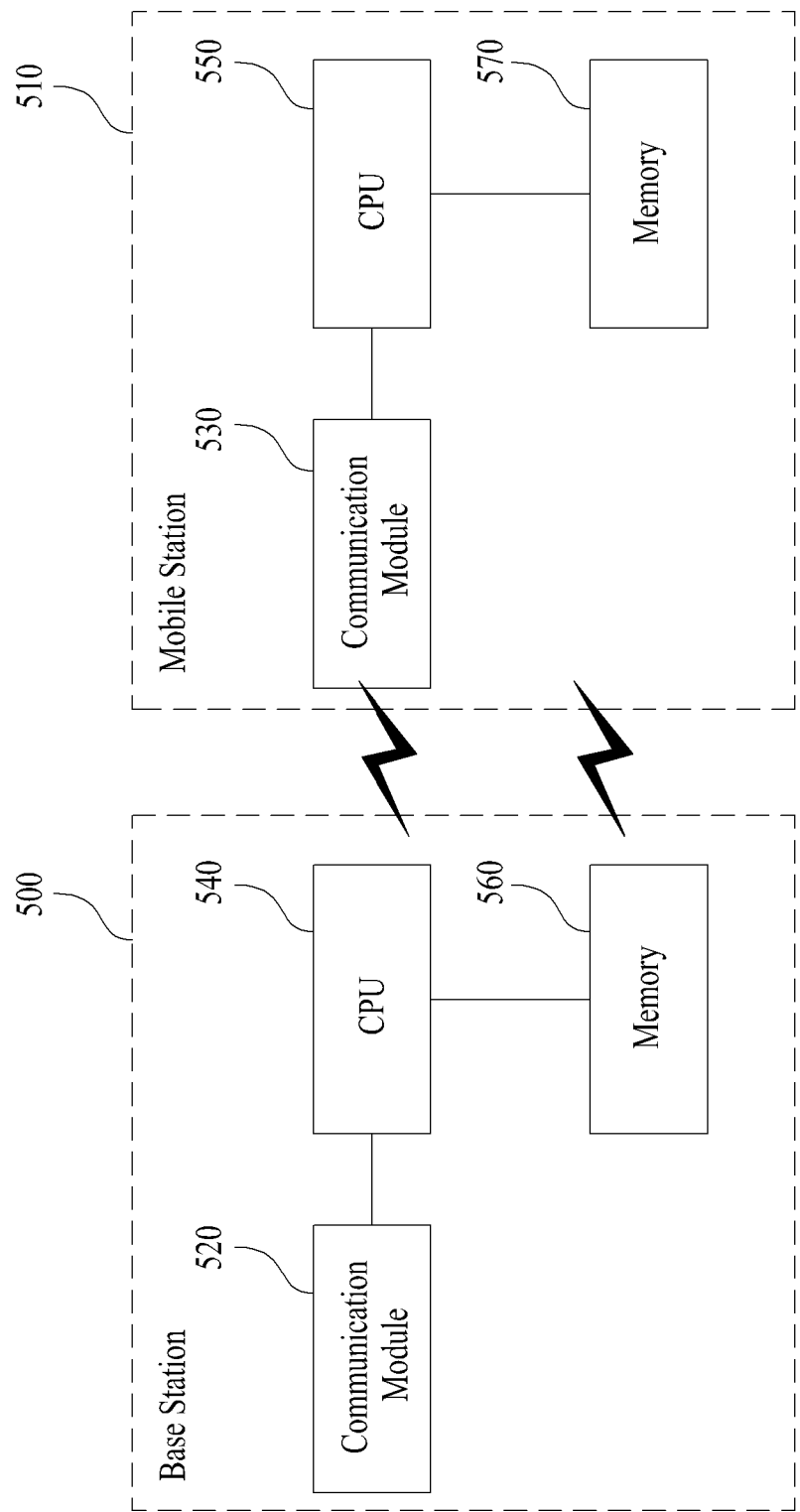
FIG. 5 illustrates a block view showing exemplary structures of a mobile station and a base station that may be implemented in the exemplary embodiments of the present invention.

FIG. 5 illustrates a block view showing exemplary structures of a mobile station and a base station that may be implemented in the exemplary embodiments of the present invention.

Each of a mobile station (or AMS (Advanced Mobile Station)) and a base station (or ABS (Advanced Base Station)) includes an antenna configured to be capable of transmitting and receiving (or transceiving) information, data, signals, and/or message to and from one another, a communication module (520, 530) including a transmission module configured to transmit a message by controlling the antenna and a receiving module configured to receive a message by controlling the antenna, a memory (560, 570) configured to store information related to communication, and a central processing unit (CPU) (540, 550) configured to control the respective communication module and the respective memory.

Generally, the CPU (540, 550) controls the overall operations of the mobile station or base station. Most particularly, the CPU may perform diverse functions in order to perform the above-described exemplary embodiment of the present invention, such as a control function, a MAC (Medium Access Control) frame variable control function based upon service characteristics and frequency environment (or condition), a Hand Over function, and authentication and encoding (or encryption) functions. Additionally, each processor (540, 550) may further include an encryption module configured to control the encryption of diverse messages, and a timer module configured to control the transmission and reception of diverse messages.

The CPU (550) of the mobile station applies system information of the changed S-SFH SP IE, and the CPU (540) of the base station generates system information update control information, which includes information on whether or not a change has occurred in each of the multiple S-SFH SP IEs.

The transmission module may perform predetermined coding and modulation processes on signals and/or data, which are scheduled by the processor and to be transmitted to the outside source, thereby delivering the processed data to-the antenna. The reception module performs decoding and demodulation on the radio signal, which is received from the outside source through the antenna, so as to recover the received radio signal to an original data format, thereby delivering the processed data to the CPU.

The transmission module of the base station transmits the system information update control information to the mobile station, which is currently being operated in the sleep mode, during the listening window of the corresponding mobile station.

The reception module of the mobile station receives the system information update control information, which includes the information on whether or not a change has occurred in the multiple S-SFH SP IEs, from the base station during the listening window. Then, the reception module of the mobile station uses the received system information update control information so as to receive the changed S-SFH SP IE.

A program for processing and controlling the processor may be stored in the memory (560, 570). The memory may also perform functions for temporarily storing input/output data (in case of a mobile station, uplink grant (UL Grant) assigned (or allocated) from the base station, system information, station identifier (STID), flow identifier (FID), Action Time, region (or zone) assignment information, and frame offset information, and so on).

Furthermore, the memory may include at least one type of storage means, such as a flash memory type, a hard-disk type, a multimedia card micro type, a card-type memory (e.g., SD or XD memory, etc.), a Random Access Memory (RAM), a SRAM (Static Random Access Memory), a Read-Only Memory (ROM), an EEPROM (Electrically Erasable Programmable Read-Only Memory), a PROM (Programmable Read-Only Memory), a magnetic memory, a magnetic disk, and an optical disk.

As described above, the detailed description of the disclosed preferred embodiments of the present invention is provided so that anyone skilled in the art can realize and carry out the present invention. In the above description, although the present invention is described with reference to the preferred embodiments of the present invention, it will be apparent to those skilled in the art that various modifications and variations can be made in the present invention without departing from the spirit or scope of the inventions.

Therefore, the present invention is not intended to limit the present invention to the embodiments presented herein. Instead, it is intended that the present invention grants a broadest range matching the principles and new characteristics disclosed herein.

What is claimed is:

1. In a method for receiving system information update control information by a mobile station operating in a sleep mode in a wireless communication system, the method comprises:
    receiving system information update control information from a base station during a listening window, the system information update control information including information on whether or not a change has occurred in each of a plurality of secondary super frame header subpacket information elements (hereinafter referred to as "S-SFH SP IEs"); and
    receiving a changed S-SFH SP IE by using the received system information update control information,
    wherein the system information update control information includes a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

2. The method of claim 1, wherein the system information update control information further includes a third field indicating an application time point of the S-SFH SP IE corresponding to a value of the first field.

3. The method of claim 2, wherein the third field corresponds to a super frame number of a super frame to which the S-SFH SP IE corresponding to the value of the first field is being applied.

4. The method of claim 2, wherein the third field corresponds to a super frame offset starting from the time point, at which the system information update control information is being transmitted, to a time point, at which the S-SFH SP IE corresponding to the value of the first field is being applied.

5. The method of claim 1, wherein the system information update control information further includes a fourth field indicating a transmission time point, at which a changed S-SFH SP IE is being transmitted.

6. The method of claim 1, wherein the system information update control information is transmitted through any one of an A-MAP IE (Advanced-MAP Information Element), a MAC management message, a signaling header, and an extended header.

7. In a method for transmitting system information update control information from a base station in a wireless communication system, the method comprises:
   transmitting system information update control information to a mobile station operating in a sleep mode during a listening window, the system information update control information including information on whether or not a change has occurred in each of a plurality of secondary super frame header subpacket information elements (hereinafter referred to as "S-SFH SP IEs"); and
   transmitting a changed S-SFH SP IE by using the received system information update control information,
   wherein the system information update control information includes a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

8. The method of claim 7, wherein the system information update control information further includes a third field indicating an application time point of the S-SFH SP IE corresponding to a value of the first field.

9. The method of claim 8, wherein the third field corresponds to a super frame number of a super frame to which the S-SFH SP IE corresponding to the value of the first field is being applied.

10. The method of claim 8, wherein the third field corresponds to a super frame offset starting from the time point, at which the system information update control information is being transmitted, to a time point, at which the S-SFH SP IE corresponding to the value of the first field is being applied.

11. The method of claim 7, wherein the system information update control information further includes a fourth field indicating a transmission time point, at which a changed S-SFH SP IE is being transmitted.

12. The method of claim 7, wherein the system information update control information is transmitted through any one of an A-MAP IE (Advanced-MAP Information Element), a MAC management message, a signaling header, and an extended header.

13. In a mobile station of a wireless communication system, the mobile station comprises:
   a reception module configured to receive system information update control information from a base station during a listening window, while the mobile station is being operated in a sleep mode, the system information update control information including information on whether or not a change has occurred in each of a plurality of secondary super frame header subpacket information elements (hereinafter referred to as "S-SFH SP IEs"), and to receive a changed S-SFH SP IE by using the received system information update control information; and
   a central processing unit (CPU) configured to apply system information of the changed S-SFH SP IE,
   wherein the system information update control information includes a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

14. The mobile station of claim 13, wherein the system information update control information is transmitted through any one of an A-MAP IE (Advanced-MAP Information Element), a MAC management message, a signaling header, and an extended header.

15. In a base station of a wireless communication system, the base station comprises:
   a central processing unit (CPU) configured to generate system information update control information, the system information update control information including information on whether or not a change has occurred in each of a plurality of secondary super frame header subpacket information elements (hereinafter referred to as "S-SFH SP IEs"); and
   a transmission module configured to transmit the system information update control information to a mobile station operating in a sleep mode, during a listening window of the mobile station,
   wherein the system information update control information includes a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

16. The base station of claim 15, wherein the system information update control information is transmitted through any one of an A-MAP IE (Advanced-MAP Information Element), a MAC management message, a signaling header, and an extended header.

17. In a mobile station of a wireless communication system, the mobile station comprises:
   a central processing unit (CPU) configured to control operations of the mobile station;
   a memory configured to store information related to communication with a base station; and
   a communication module configured to control the communication with the base station,
   wherein the communication module comprises a reception module configured to receive system information update control information from a base station during a listening window, while the mobile station is being operated in a sleep mode, the system information update control information including information on whether or not a change has occurred in each of a plurality of secondary super frame header subpacket information elements (hereinafter referred to as "S-SFH SP IEs"), and to receive a changed S-SFH SP IE by using the received system information update control information, wherein the system information update control information includes a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

18. In a base station of a wireless communication system, the base station comprises:
- a central processing unit (CPU) configured to control operations of the base station;
- a memory configured to store information related to communication; and
- a communication module configured to control the communication, wherein the communication module comprises a transmission module configured to transmit system information update control information to a mobile station operating in a sleep mode during a listening window, the system information update control information including information on whether or not a change has occurred in each of a plurality of secondary super frame header subpacket information elements (hereinafter referred to as "S-SFH SP IEs"), wherein the system information update control information includes a first field and a second field, wherein the first field indicates version information of an S-SFH that is to be transmitted at a time point when the system information update control information is being transmitted, or after a time point when the system information update control information is being transmitted, and wherein the second field indicates which S-SFH SP IE has been changed.

\* \* \* \* \*